United States Patent
Ulichney

(10) Patent No.: US 11,029,665 B2
(45) Date of Patent: Jun. 8, 2021

(54) DENSITY RANK MATRIX GENERATION FOR THREE-DIMENSIONAL PRINTING

(71) Applicant: Hewlett-Packard Development Company, L.P., Houston, TX (US)

(72) Inventor: Robert Ulichney, Stow, MA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 407 days.

(21) Appl. No.: 16/072,270

(22) PCT Filed: Apr. 29, 2016

(86) PCT No.: PCT/US2016/030176
§ 371 (c)(1),
(2) Date: Jul. 24, 2018

(87) PCT Pub. No.: WO2017/189001
PCT Pub. Date: Nov. 2, 2017

(65) Prior Publication Data
US 2019/0033829 A1   Jan. 31, 2019

(51) Int. Cl.
*G05B 19/4099* (2006.01)
*B33Y 50/00* (2015.01)
(Continued)

(52) U.S. Cl.
CPC ......... *G05B 19/4099* (2013.01); *B29C 64/10* (2017.08); *B29C 64/386* (2017.08);
(Continued)

(58) Field of Classification Search
CPC ...... G05B 19/4099; G05B 2219/49007; B33Y 50/00; B33Y 10/00; B29C 64/10; B29C 64/386; G06F 7/00
See application file for complete search history.

(56) References Cited

U.S. PATENT DOCUMENTS 5,028,950 A    7/1991  Fritsch
5,483,351 A    1/1996  Mailloux et al.
(Continued)

FOREIGN PATENT DOCUMENTS

CN    103978690 A    8/2014
CN    105183405 A    12/2015
(Continued)

OTHER PUBLICATIONS

Ulichnely et al. "Density Matrix Generation for 3D Printing". 2017 Society for Imaging Science and Technology. Pges: 181-186. (Year: 2017).*
(Continued)

*Primary Examiner* — Eunhee Kim
(74) *Attorney, Agent, or Firm* — Mannava & Kang

(57) ABSTRACT

According to an example, density rank matrix generation for three-dimensional printing may include determining dimensions of a density rank matrix based on a skeleton line specification of a lattice structure and a density rank matrix size specification. A number of elements of the density rank matrix may be determined based on the dimensions of the density rank matrix. The elements may be sorted based on an analysis of a property of each of the elements relative to the lattice structure. The density rank matrix may be generated based on the sorting of the elements.

19 Claims, 17 Drawing Sheets

(51) Int. Cl.
  *B33Y 10/00*  (2015.01)
  *G06F 7/00*  (2006.01)
  *B29C 64/10*  (2017.01)
  *B29C 64/386*  (2017.01)

(52) U.S. Cl.
  CPC ............... *B33Y 10/00* (2014.12); *B33Y 50/00* (2014.12); *G06F 7/00* (2013.01); *G05B 2219/49007* (2013.01)

(56) References Cited

U.S. PATENT DOCUMENTS

| | | | |
|---|---|---|---|
| 2005/0179949 A1* | 8/2005 | Hagai | H04N 1/4051 358/3.03 |
| 2006/0256151 A1* | 11/2006 | Yamazaki | H04N 1/40031 347/15 |
| 2014/0031967 A1 | 1/2014 | Unger et al. | |
| 2014/0303942 A1 | 10/2014 | Wighton et al. | |
| 2014/0324204 A1 | 10/2014 | Vidimce et al. | |
| 2015/0193559 A1 | 7/2015 | Musuvathy | |
| 2018/0009168 A1* | 1/2018 | Morovic | B29C 64/393 |

FOREIGN PATENT DOCUMENTS

| | | |
|---|---|---|
| EP | 1437882 A1 | 7/2004 |
| WO | WO-2013117001 A1 | 8/2013 |
| WO | WO-2016119908 | 8/2016 |
| WO | WO-2017188999 A2 | 11/2017 |

OTHER PUBLICATIONS

Alzahrani, Mahmoud et al: Design of truss-like cellular structures using relative density mapping method. Material and Design. vol. 85, Nov. 1, 2015 pp. 439-360.

Lou, Qun et al: Fundamentals of 3D halftonight. International conference on Financial Cryptography and Data security. Jan. 1, 1998 Springer.

Telea Alexandru et al. "Voxel-based assessment of printability of 3D shapes". Int'l Symposium on Mathematical Morphology and Its Applications to Signal and Image Processing, Jul. 6, 2011 (pp. 393-404) Springer, Berlin, Heidelberg.

* cited by examiner

| Line Position | $p_1$ | $p_2$ |
|---|---|---|
| *Bottom Square:* | (0, 0, 0) | (1, 0, 0) |
| | (1, 0, 0) | (1, 1, 0) |
| | (1, 1, 0) | (0, 1, 0) |
| | (0, 1, 0) | (0, 0, 0) |
| *Top Square:* | (0, 0, 1) | (1, 0, 1) |
| | (1, 0, 1) | (1, 1, 1) |
| | (1, 1, 1) | (0, 1, 1) |
| | (0, 1, 1) | (0, 0, 1) |
| *Diagonals:* | (0, 0, 0) | (1, 1, 1) |
| | (1, 0, 0) | (0, 1, 1) |
| | (1, 1, 0) | (0, 0, 1) |
| | (0, 1, 0) | (1, 0, 1) |
| *Middle Cross:* | (0, 1/2, 1/2) | (1, 1/2, 1/2) |
| | (1/2, 0, 1/2) | (1/2, 1, 1/2) |

FIG. 10

| Line Position | $p_1$ | $p_2$ |
|---|---|---|
| *Bottom Square:* | (0, 0, 0) | (X, 0, 0) |
| | (X, 0, 0) | (X, Y, 0) |
| | (X, Y, 0) | (0, Y, 0) |
| | (0, Y, 0) | (0, 0, 0) |
| *Top Square:* | (0, 0, Z) | (X, 0, Z) |
| | (X, 0, Z) | (X, Y, Z) |
| | (X, Y, Z) | (0, Y, Z) |
| | (0, Y, Z) | (0, 0, Z) |
| *Diagonals:* | (0, 0, 0) | (X, Y, Z) |
| | (X, 0, 0) | (0, Y, Z) |
| | (X, Y, 0) | (0, 0, Z) |
| | (0, Y, 0) | (X, 0, Z) |
| *Middle Cross:* | (0, Y/2, Z/2) | (X, Y/2, Z/2) |
| | (X/2, 0, Z/2) | (X/2, Y, Z/2) |

FIG. 11

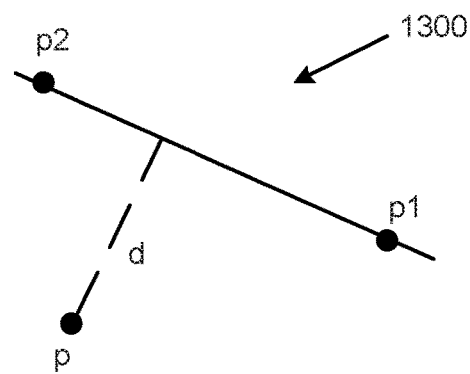
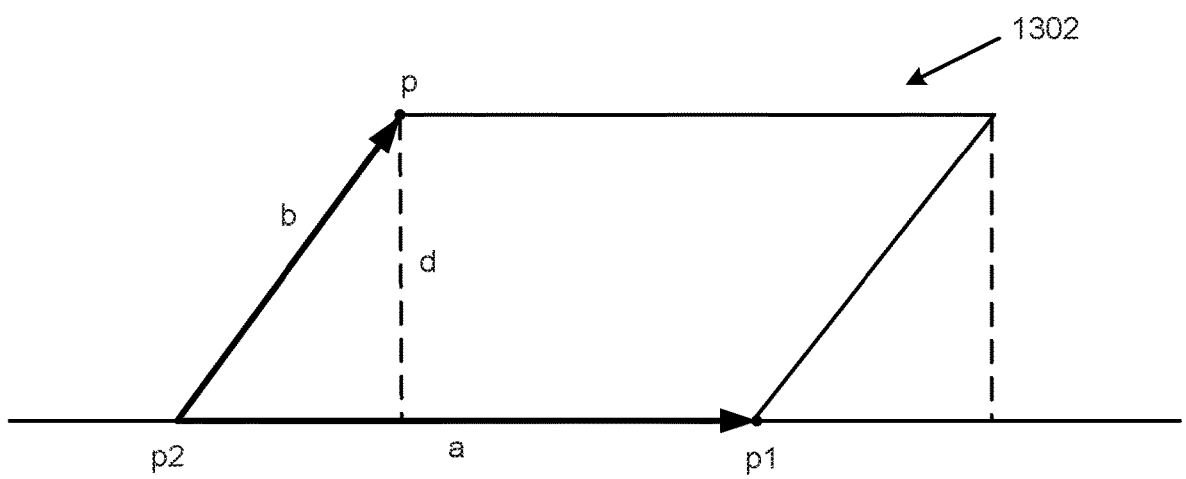
FIG. 13

1700

```
┌─────────────────────────────────────────────────────────┐
│ DETERMINE, BASED ON A SKELETON LINE SPECIFICATION OF    │
│ A LATTICE STRUCTURE AND A DENSITY RANK MATRIX SIZE      │
│ SPECIFICATION, DIMENSIONS OF A DENSITY RANK MATRIX      │
│                        1702                              │
└─────────────────────────────────────────────────────────┘
                            ↓
┌─────────────────────────────────────────────────────────┐
│ DETERMINE, BASED ON THE DIMENSIONS OF THE DENSITY RANK  │
│ MATRIX, A NUMBER OF ELEMENTS OF THE DENSITY RANK MATRIX │
│                        1704                              │
└─────────────────────────────────────────────────────────┘
                            ↓
┌─────────────────────────────────────────────────────────┐
│    SORT THE ELEMENTS BASED ON AN ANALYSIS OF A          │
│    PROPERTY OF EACH OF THE ELEMENTS RELATIVE TO         │
│                 THE LATTICE STRUCTURE                    │
│                        1706                              │
└─────────────────────────────────────────────────────────┘
                            ↓
┌─────────────────────────────────────────────────────────┐
│   GENERATE, BASED ON THE SORTING OF THE ELEMENTS,       │
│           THE DENSITY RANK MATRIX                        │
│                        1708                              │
└─────────────────────────────────────────────────────────┘
```

FIG. 17

DENSITY RANK MATRIX GENERATION FOR THREE-DIMENSIONAL PRINTING

BACKGROUND

In three-dimensional (3D) printing, one technique to create an object is with successive layers of material. The successive layers of material may be applied under computer control. The object may be formed from a variety of sources. For example, the object may be formed from a 3D model. The object may be formed of virtually any geometry. Further, the object may be formed of any material, including ceramics, metals, polymers, and composites.

BRIEF DESCRIPTION OF DRAWINGS

Features of the present disclosure are illustrated by way of example and not limited in the following figure(s), in which like numerals indicate like elements, in which:

FIG. 10 illustrates a unit skeleton line set for a tetrahedral-octahedral lattice defined by pairs of end points, according to an example of the present disclosure;

FIG. 11 illustrates a scaled skeleton line set, according to an example of the present disclosure;

FIG. 13 illustrates a technique for finding the closest distance from a point to a line, according to an example of the present disclosure;

FIG. 17 illustrates a flowchart of a method for density rank matrix generation for three-dimensional printing, according to an example of the present disclosure;

DETAILED DESCRIPTION

Figure 1:
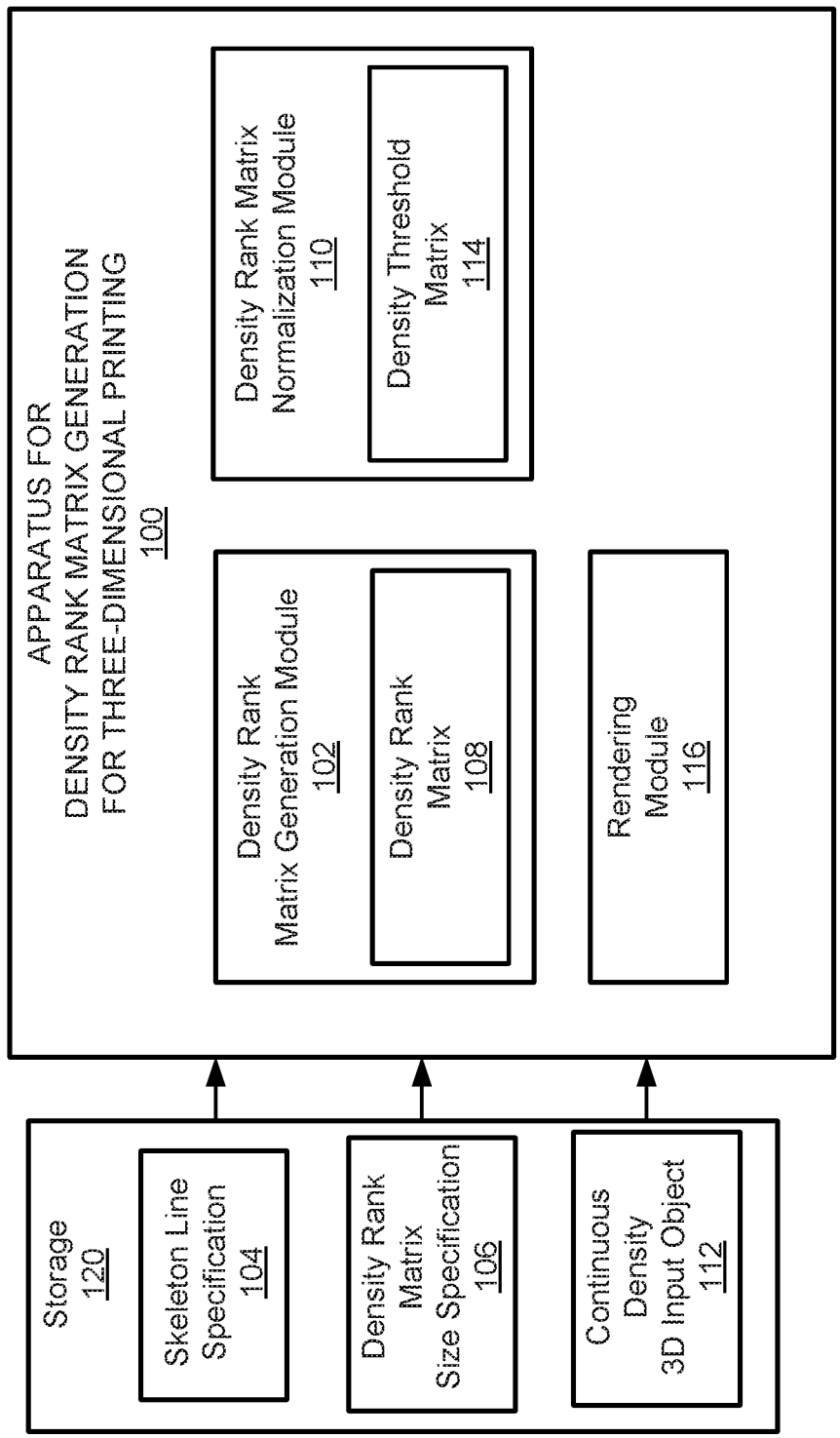
FIG. 1 illustrates an architecture of an apparatus for density rank matrix generation for three-dimensional printing, according to an example of the present disclosure.

For simplicity and illustrative purposes, the present disclosure is described by referring mainly to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, and the term "including" means including but not limited to. The term "based on" means based at least in part on.

With respect to the manufacture of 3D objects, reducing an overall amount of material used for the manufacture of a 3D object may be desirable from a weight reduction perspective. Reducing fused material in a core of an otherwise solid object may also be desirable from a thermal management perspective. However, reducing the amount of overall material used and/or reducing fused material in a core of an otherwise solid object may reduce the object's structural strength and/or the object's ability to accommodate stresses.

In order to address the aforementioned technical challenges with respect to the manufacture of 3D objects to maintain structural strength and stress accommodation properties, an apparatus for density rank matrix generation for 3D printing and a method for density rank matrix generation for 3D printing are disclosed herein.

For the apparatus and method disclosed herein, a density rank matrix may be generated. The density rank matrix may be normalized to generate a density threshold matrix. The density threshold matrix may be analyzed with respect to details of a continuous density 3D input object to generate a bistate output object. Accordingly, the density rank matrix may be used in a 3D object manufacturing process, where the 3D object that is manufactured includes variable density, and includes a specified structural strength, specified stress accommodation properties, and other such properties.

The attribute of density may be described as solidness or its inverse sparsity. A density of a 3D object may range from 0%, which may be referred to as empty space, to 100%, which may be referred to as solid.

The density rank matrix may be described as a periodic 3D matrix of size X by Y by Z (i.e., (X,Y,Z)), where each element is an integer indicating the order that the element will turn on a voxel with increasing density. The density rank matrix may be referred to herein as a rectangular periodic matrix, where the density rank matrix provides a rectangular period that tiles all of three-dimensional space. The density rank matrix may provide for the rendering of a variable density 3D object. The density rank matrix may be applied to objects for which the interior needs less material or weight, while still maintaining the object strength.

The density threshold matrix may be described as a matrix for which the rank values in the density rank matrix are converted to threshold values normalized to a range of values used in a continuous density 3D input object. The density threshold matrix may be the same size as the density rank matrix (i.e., (X,Y,Z)).

The 3D input object may be described as any object that is to be printed and includes a three-dimensional shape. The 3D input object may include discrete-space values that describe the density at each point of the object, from empty space, represented by zero, to solid, represented by a maximum value.

The bistate output object may be described as an object that includes discrete-space where each point is represented by one of two states: zero for empty space, or one for print-a-voxel.

In order to generate the bistate output object, a rendering system may be used. An example of a rendering system may include a 3D printer, and other such devices. For the rendering system, each element of the 3D input object, input(x, y, z), may be compared against a corresponding threshold value in the density threshold matrix, threshold (x, y, z), to print the bistate output object.

In order to generate the density rank matrix, elements of the density rank matrix may be generated form a skeleton line set using a line dilation technique as disclosed herein. For the line dilation technique, for each unassigned point of the density rank matrix, a minimum distance from the point to a skeleton line may be assigned. Each of the assigned points of the density rank matrix may be rank ordered by distance to generate the density rank matrix.

The skeleton line set may be described as a set of lines segments in a repeating rectangular volume that describe a specified lattice. An example of a lattice may include a tetrahedral-octahedral lattice. The tetrahedral-octahedral lattice may be described as a lattice that includes tetrahedral shapes in the interior thereof. For the apparatus and method disclosed herein, the tetrahedral-octahedral lattice may be rendered by reducing the lattice to a rectangular period.

The apparatus and method disclosed herein may provide a relatively high resolution structure definition. For example, the aspect of ranking with respect of each of the elements of the density rank matrix may provide a relatively high resolution structure definition.

Figure 2:
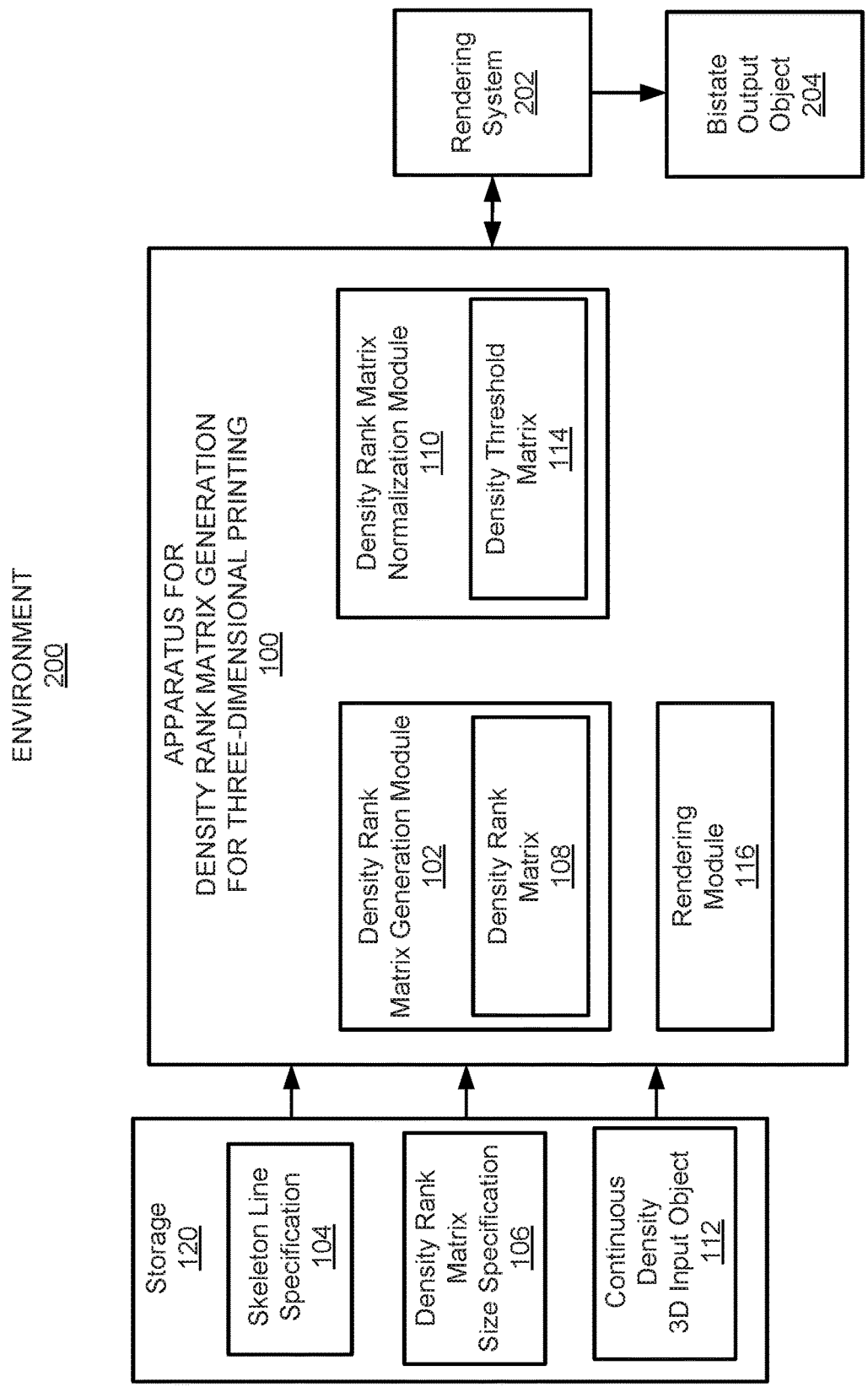
FIG. 2 illustrates an environment including the apparatus 100, according to an example of the present disclosure.

FIG. 1 illustrates an architecture of an apparatus for density rank matrix generation for three-dimensional printing (hereinafter also referred to as "apparatus 100"), according to an example of the present disclosure. FIG. 2 illustrates an environment 200 for the apparatus 100, according to an example of the present disclosure.

Referring to FIG. 1, the apparatus 100 is depicted as including a density rank matrix generation module 102 to receive a skeleton line specification 104, and a density rank matrix size specification 106 (e.g., X). The operations disclosed herein with respect to the density rank matrix generation module 102 may be performed by a processor (e.g., the processor 2002 of FIG. 20). The skeleton line specification 104 and the density rank matrix size specification 106 may be stored in and retrieved from a storage 120. As disclosed herein, the skeleton line specification 104 and the density rank matrix size specification 106 may be analyzed to generate a density rank matrix 108. The density rank matrix 108 may include rank values that range from 1 to n, where n represents a total number of elements of the density rank matrix 108. For example, for an X by Y by Z density rank matrix 108, the total number of elements n may include X times Y times Z elements.

A density rank matrix normalization module 110 may convert the rank values in the density rank matrix 108 to threshold values, where the threshold values are normalized to a range of values used in a 3D input object 112 to generate a density threshold matrix 114. The operations disclosed herein with respect to the density rank matrix normalization module 110 may be performed by a processor (e.g., the processor 2002 of FIG. 20). The values used in the 3D input object 112 may be stored in and retrieved from the storage 120. The density threshold matrix may be the same size as the density rank matrix (i.e., (X, Y, Z)). The range of values used in the 3D input object 112 may represent the specification of the 3D input object 112. For example, if the 3D input object 112 is specified with 8 bit elements, the range of values would be from 0-255. The density rank matrix normalization module 110 may normalize the rank values of the density rank matrix 108 by scaling the rank values to match an input amplitude range of input values of the 3D input object 112. For example, if the input values of the 3D input object 112 are 8 bits, then the input amplitude range may be between 0-255, and the rank values of the density rank matrix 108 may be normalized between 0-255 to generate the density threshold matrix 114.

A rendering module 116 may compare each element of the 3D input object 112, input(x, y, z), against a corresponding threshold value in the density threshold matrix 114, threshold(x, y, z), at each location as follows:

if Input$(x,y,z)$>Threshold$(x',y',z')$ then Output$(x,y,z)$=1(i.e., printer voxel)

else Output$(x,y,z)$=0(i.e., empty space)

where x'=x mod X; y'=y mod Y; and z'=z mod Z. The "mod" may represent the modulo operation. The operations disclosed herein with respect to the rendering module 116 may be performed by a processor (e.g., the processor 2002 of FIG. 20).

In some examples, the modules and other elements of the apparatus 100 may be machine readable instructions stored on a non-transitory computer readable medium. In this regard, the apparatus 100 may include or be a non-transitory computer readable medium. In some examples, the modules and other elements of the apparatus 100 may be hardware or a combination of machine readable instructions and hardware.

Referring to FIG. 2, the output of the rendering module 116 (i.e., Output(x, y, z)=1 (i.e., printer voxel), or Output(x, y, z)=0 (i.e., empty space)) may be used by a rendering system 202 to generate a bistate output object 204.

Determination of the density rank matrix 108 is described in further detail with reference to FIGS. 1, and 3-16.

For the density rank matrix 108, the skeleton line specification 104 may describe a set of lines segments in a repeating rectangular volume that describe a specified lattice. An example of a lattice may include a tetrahedral-octahedral lattice. Another example of a lattice may include a cube-based lattice. Any type of lattice structure may be used with the apparatus 100.

An example of a structural lattice includes one formed by segments connecting centers of packed equi-sized spheres. The spheres may be packed in two ways.

Figure 4B:
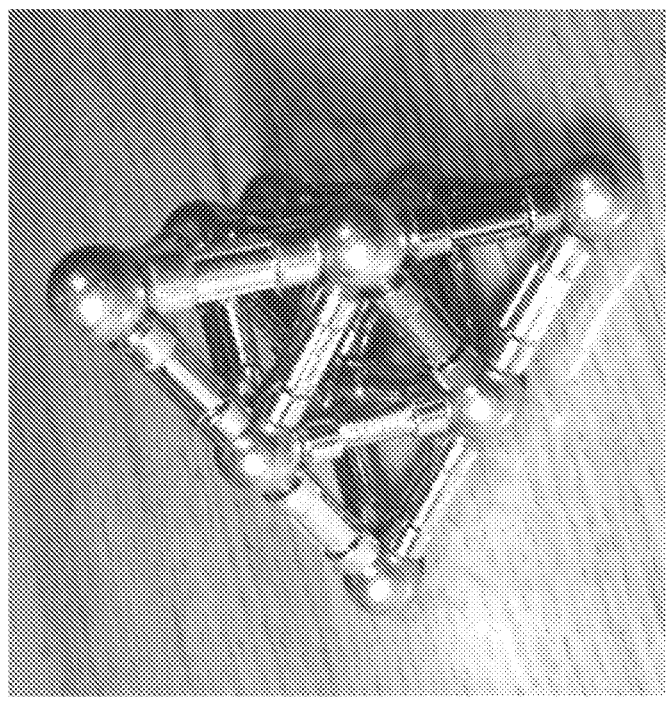
FIG. 4B represents a model of the underlying lattice suggested by the arrangement of FIG. 4A, according to an example of the present disclosure.
Figure 4A:
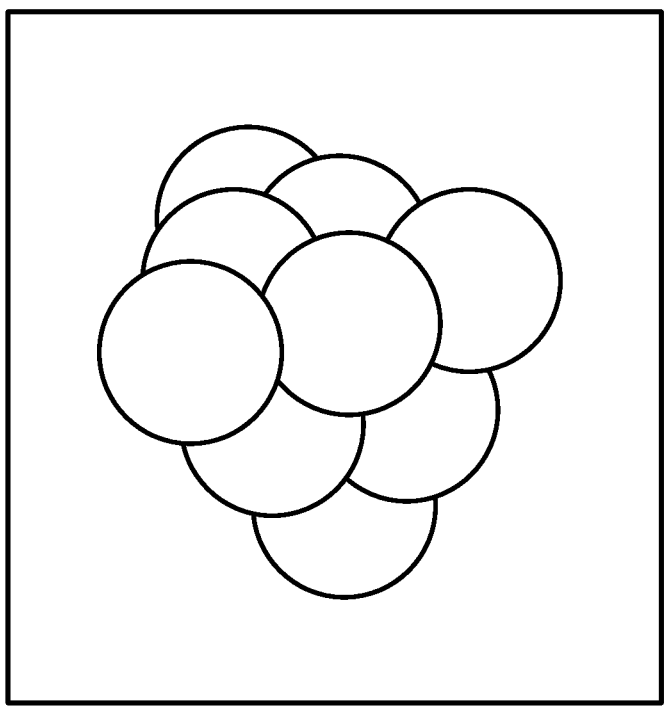
FIG. 4A represents a pattern formed by packing spheres with a base that forms a triangle.

A first way to pack spheres includes triangular pyramid sphere packing as depicted in FIGS. 4A and 4B. FIG. 4A represents a pattern formed by packing spheres with a base that forms a triangle. FIG. 4B represents a model of the underlying lattice suggested by the arrangement of FIG. 4A. The arrangement of FIG. 4B may represent a structure that connects the center of the spheres of FIG. 4A. The triangular packing technique of FIG. 4A may also be described as hexagonal packing.

Figure 5B:
FIG. 5B represents a model of the underlying lattice suggested by the arrangement of FIG. 5A, according to an example of the present disclosure.
Figure 5A:
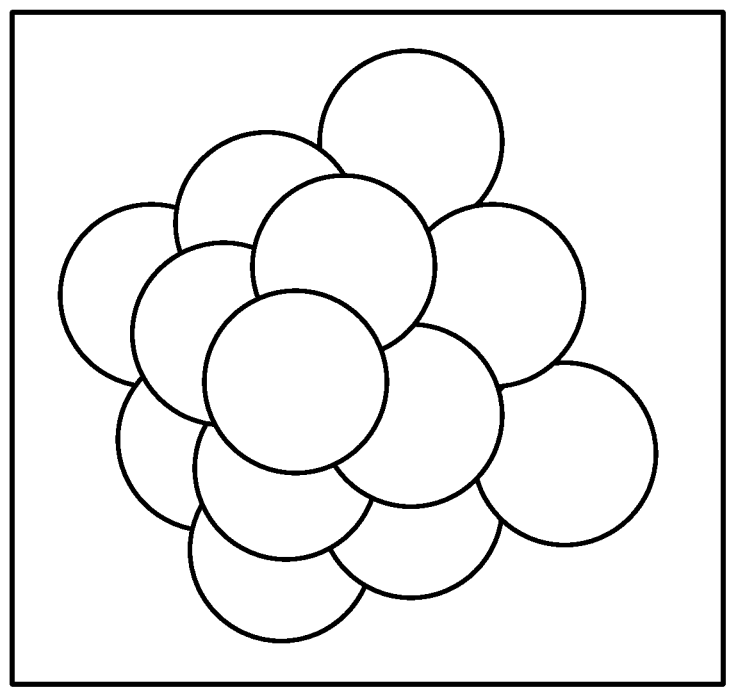
FIG. 5A represents a pattern formed by packing spheres with a base that forms a square.

A second way to pack spheres includes square pyramid sphere packing as depicted in FIGS. 5A and 5B. FIG. 5A represents a pattern formed by packing spheres with a base that forms a square. FIG. 5B represents a model of the underlying lattice suggested by the arrangement of FIG. 5A. The arrangement of FIG. 5B may represent a structure that connects the center of the spheres of FIG. 5A.

For the arrangements of FIGS. 4A and 4B, and FIGS. 5A and 5B, the line segments may all include the same length.

The packing techniques of FIGS. 4A and 4B, and FIGS. 5A and 5B may represent the same packing technique in tessellating space. In this regard, the packing techniques of FIGS. 4A and 4B, and FIGS. 5A and 5B may differ by an angle of rotation θ around an axis defined by any horizontal segment in either the triangular or square pyramids.

Figure 6A:
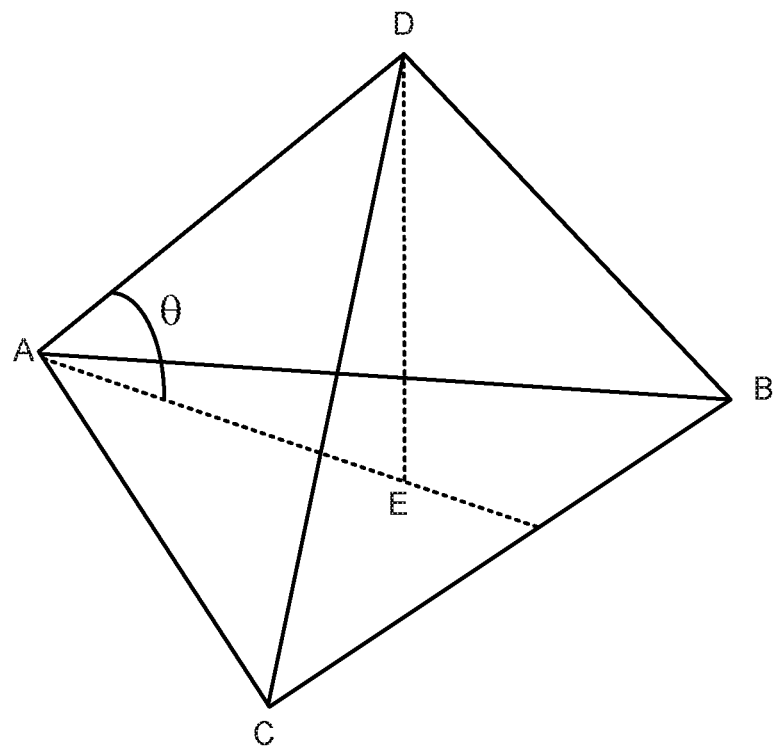
FIG. 6A illustrates a portion of a triangle pyramid lattice with a horizontal base.
Figure 7:
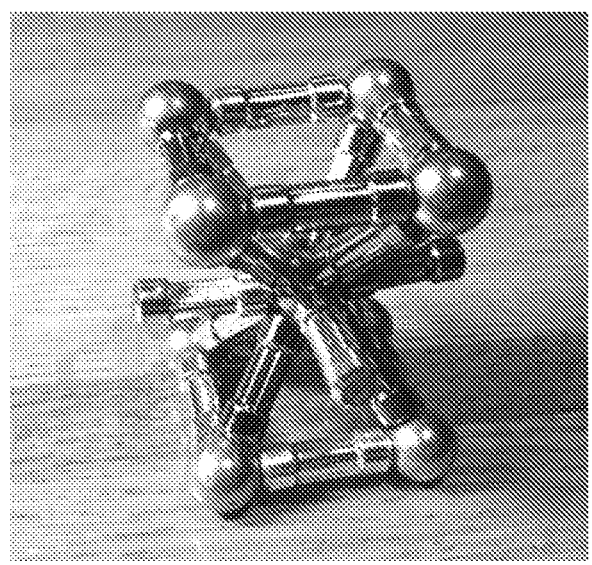
FIG. 7 illustrates a model of a rectangular period used to form a square pyramid lattice, according to an example of the present disclosure.

In order to determine the properties of the tetrahedral-octahedral lattice of FIG. 7, FIG. 6A illustrates a portion of a triangle pyramid lattice with a horizontal base ABC, according to an example of the present disclosure. Referring to FIG. 6A, the solid lines represent equal segments of length one. The dashed lines represent perpendicular segments. The angle ∠DAE=θ may represent the angular difference between a triangular pyramid and a square pyramid.

Figure 6B:
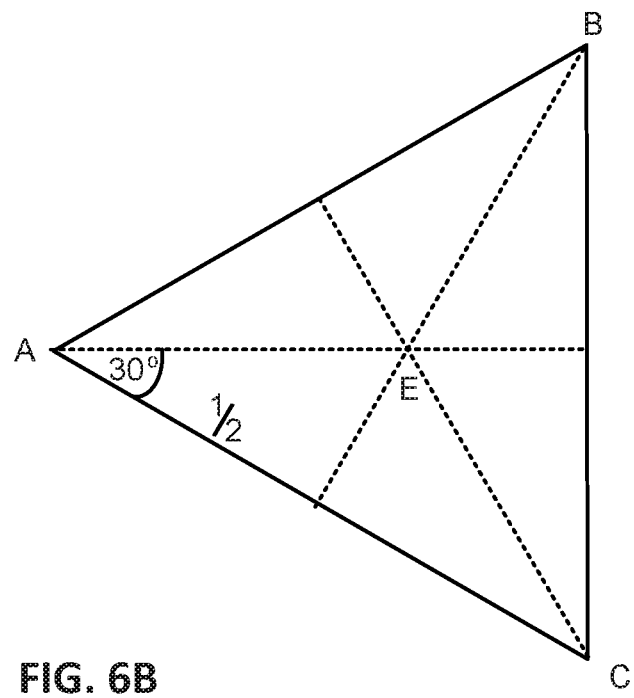
FIG. 6B illustrates an equilateral triangle with perpendicular bisectors, according to an example of the present disclosure.

Further, FIG. 6B illustrates an equilateral triangle ABC with perpendicular bisectors, according to an example of the present disclosure. Referring to FIG. 6B, the solid lines represent equal segments of length one. The dashed lines represent perpendicular segments. The length of segment $\overline{AE}$ may be determined as follows: $\overline{AE}=\frac{1}{2}/\cos(30°)=\sqrt{3}/3$. The angle θ may be determined as follows: $\theta=\cos^{-1}(\overline{AE}/\overline{AD})=\cos^{-1}(\sqrt{3}/3)\approx 54.7°$.

Figure 8:
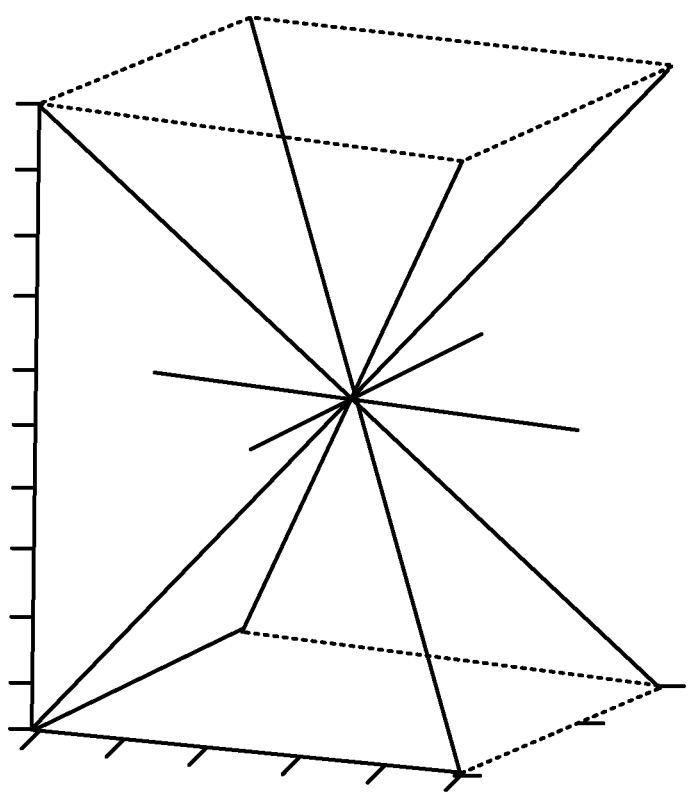
FIG. 8 illustrates a line skeleton of a rectangular period, according to an example of the present disclosure.

With respect to the pyramid structures of FIGS. 4A and 4B, and FIGS. 5A and 5B, a repeating rectangular period may be determined in the square pyramid packing structure. A model of the repeating rectangular period is shown in FIG. 7. The model of FIG. 7 may represent a tetrahedral-octahedral lattice. Further, the skeleton line set corresponding to the repeating rectangular period is depicted in FIG. 8. With respect to FIGS. 7 and 8, as the repeating rectangular period will tessellate three-dimensional space, lines that in part of the repeating rectangular period and lines that are part of neighboring periods may be identified. For example, as shown in FIG. 8, the dashed lines may represent lines that are part of neighboring periods (i.e., lines that are not in the fundamental period). The top, back, and adjacent right side planes for the skeleton line set may include unique data, whereas the front, adjacent left side, and bottom planes of the skeleton line set do not include unique data. The repeating rectangular period may include a dimensional ratio x:y:z of $1:1:\sqrt{2}$.

Compared to the representation of FIG. 7 that represents a tetrahedral-octahedral lattice, for the example of the cube-based lattice, the lines that in part of the repeating rectangular period may include the lines that form the outer edges of the cube-based lattice.

Figure 3:
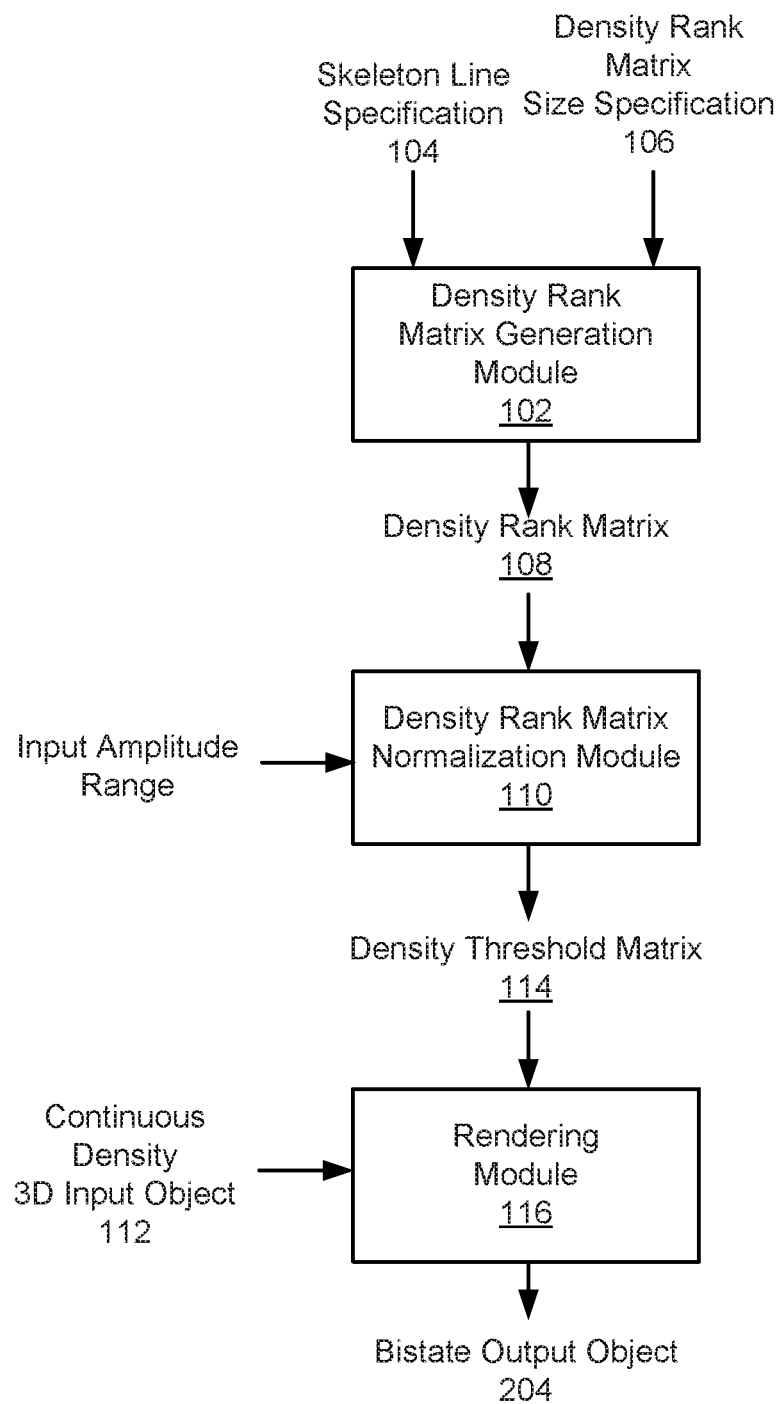
FIG. 3 illustrates a high level flowchart of density rank matrix generation, normalization, and rendering for the apparatus of FIG. 1, according to an example of the present disclosure.
Figure 9:
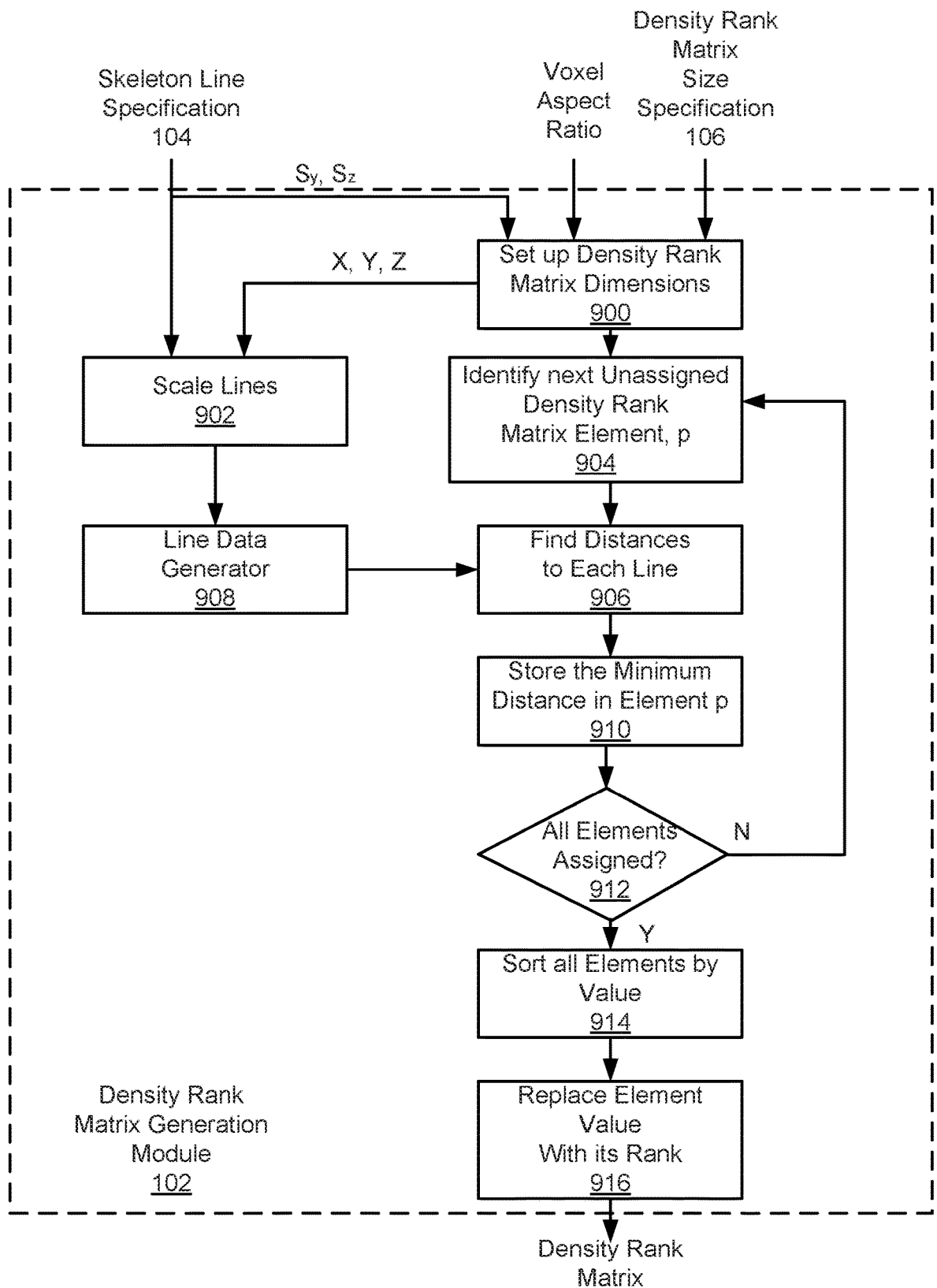
FIG. 9 illustrates details of a density rank matrix generator of the apparatus of FIG. 1, according to an example of the present disclosure.

Referring to FIGS. 1, 3, and 9, in order to generate the density rank matrix 108, the density rank matrix generation module 102 may receive as inputs the skeleton line specification 104 of a lattice as disclosed herein with reference to FIGS. 4A-7, and the density rank matrix size specification 106 (e.g., X). The density rank matrix generation module 102 may generate the density rank matrix 108 by beginning with the line-based skeleton (as specified by the skeleton line specification 104) as disclosed herein with reference to FIGS. 4A-7, and generating the density rank matrix 108 based on the distance of each element of the density rank matrix 108 from the line-based skeleton. The density rank matrix generation module 102 may take all of the elements of the density rank matrix 108 in the three-dimensional period (the rectangular period), and rank order the elements from 1 to n, where n represents the total number of elements in the density rank matrix 108.

The skeleton line specification 104 may include the size of the period and a unit skeleton line set. The size of the period may be expressed relative the x dimension of the lattice, or $1:s_y:s_z$. For the example of the tetrahedral-octahedral lattice, $s_y=1$, $s_z=\sqrt{2}-1.414$. For the example of the cube-based lattice, $s_y=1=s_z=1$. The unit skeleton line set may be expressed as a list of lines defined by two end points inside a unit volume. The unit skeleton line set for the tetrahedral-octahedral lattice may include a list of fourteen pairs of points as shown in FIG. 10. For example, the fourteen pairs of points may be used to describe the bottom square, the top square, the diagonals, and the middle cross of the tetrahedral-octahedral lattice.

Referring to FIG. 9, at block 900, the size of the density rank matrix 108 may be determined, and storage for the density rank matrix 108 may be allocated. The size of the density rank matrix 108 may be determined by a variable, the size in X. The other two dimensions Y and Z may be determined by a printer's voxel aspect ratio, and period size $s_y$ and $s_z$. The size of the density rank matrix 108 may represent the size of the period of the structure that will be repeated.

The voxel aspect ratio is a property of the target rendering system 202. For example, for the rendering system 202, a model of a 3D printer may include a x and y resolution of 1200 dpi, and a z resolution of 254 dpi, which makes the 3D printer's voxels longer in the z direction by 1200/254 than they are in x or y directions. The voxel aspect ratio may be expressed relative to the size in x as $v_y$ and $v_z$. For this example of the 3D printer, $v_y=1$ and $v_z=1200/254\approx 4.724$.

The density rank matrix 108 dimensions may be determined as follows:

$$X, Y=Xs_y/v_y, \text{ and } Z=XS_z/v_z$$

For a specified size of X=300, the other dimensions after rounding may be Y=300 and Z=90.

Thus, the density rank matrix 108 is a function of the skeleton line specification 104, the voxel aspect ratio, and the density rank matrix size specification 106. Once the density rank matrix 108 is determined, the density rank matrix 108 may be utilized to determine the density threshold matrix 114, which is utilized for any 3D input object 112 to generate the bistate output object 204.

At block 902, the "scale lines" process may multiply the triplets defining the endpoints of the unit skeleton set by X, Y, and Z. The resulting scaled skeleton line set is shown in FIG. 11. In this regard, the unit skeleton set of FIG. 10 for the tetrahedral-octahedral lattice may be scaled to include scaled values for the bottom square, the top square, the diagonals, and the middle cross of the tetrahedral-octahedral lattice.

Figure 12:
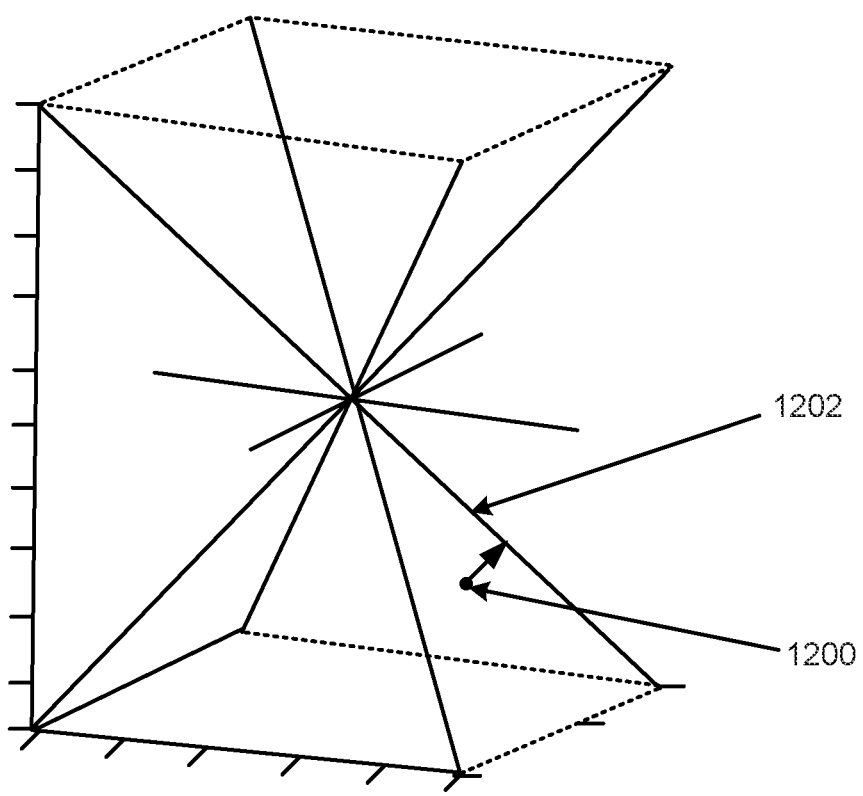
FIG. 12 illustrates an example of a matrix point and its associated line determined by the shortest distance, according to an example of the present disclosure.
Figure 14A:
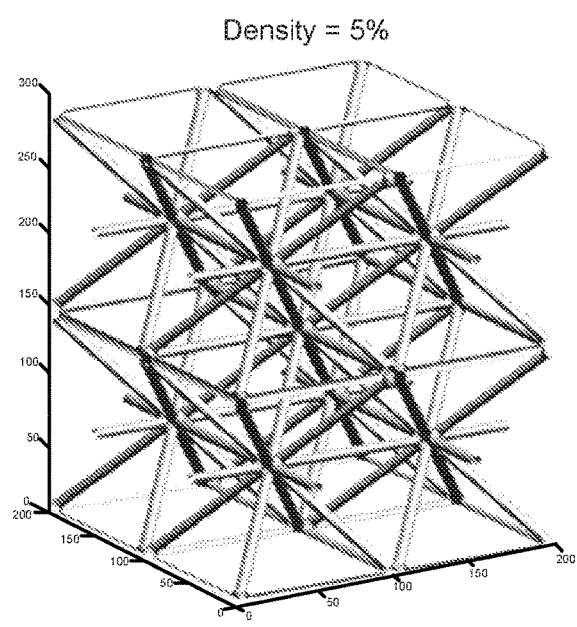
FIGS. 14A-14D illustrate 2×2×2 period output for different densities, according to an example of the present disclosure.
Figure 14B:
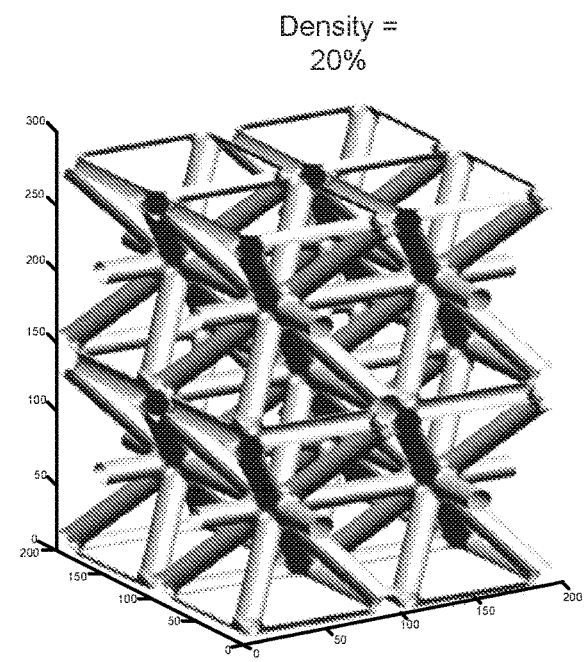
Figure 14C:
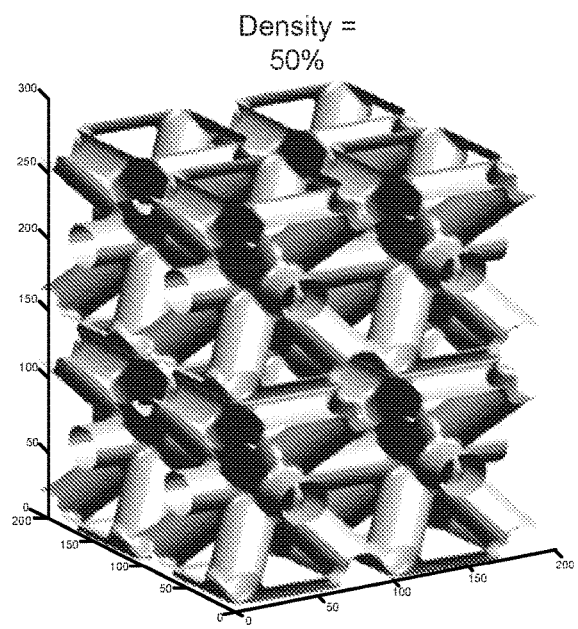
Figure 14D:
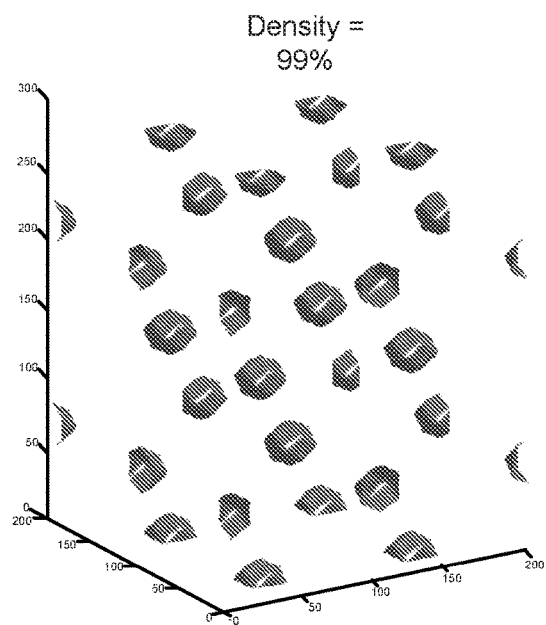

Referring again to FIG. 9, for each unassigned element, or unassigned point $\vec{p}$ of the density rank matrix 108 at block 904, at block 906, the distance to each line in the scaled skeleton line set may be determined. An example of one such a point is shown in FIG. 12 at 1200, where FIG. 12 illustrates the closest line to the point at 1200 being line 1202. The point at 1200 may be replicated, for example, above, below, left, right, front, and back, periodically in three-dimensions in accordance with the skeleton line set.

A technique of determining the closest distance from a point to a line defined by two other points is illustrated in FIG. 13. Referring to FIG. 13, at 1300, in order to determine the distance d from point $\vec{p}$ to the line defined by the two points $\vec{p}_1$ and $\vec{p}_2$ in three dimensional space, at shown at 1302, vectors $\vec{a}$ and $\vec{b}$ may be specified as follows:

$$\vec{a} = \vec{p}_1 - \vec{p}_2$$

$$\vec{b} = \vec{p} - \vec{p}_2$$

The magnitudes of the vectors $\vec{a}$ and $\vec{b}$ may be specified as follows:

$$a = |\vec{a}|, \text{ and } b = |\vec{b}|.$$

The geometric relationship involving the magnitude of the vector cross product may be specified as follows:

$$|\vec{a} \times \vec{b}| = \text{area defined by the parallelogram (illustrated at 1302)} = da$$

Thus, the distance d may be specified as follows:

$$d = |\vec{a} \times \vec{b}|/a$$

Since $\vec{a}$, a, and $\vec{p}_2$ are constants for the independent variable $\vec{p}$, d may be specified as follows:

$$d = |a \times (\vec{p} - \vec{p}_2)|/a \quad \text{Equation (1)}$$

Referring to FIGS. 9 and 11, for each of the scaled skeleton lines in FIG. 11, at block 908, the line data generator may store a vector $\vec{a}$, $\vec{p}_2$, and the scalar a to make subsequent distance calculations efficiently. For each point $\vec{p}$ in the density rank matrix 108, referring again to block 906, Equation (1) may be executed to determine the distance to each line.

At block 910, the minimum distance in element $\vec{p}$ may be determined and stored. That is, for each unassigned element $\vec{p}$ for the density rank matrix 108 at block 904, at block 910, a minimum distance associated with the unassigned element $\vec{p}$ may be assigned to the element $\vec{p}$.

At block 912, the processing at blocks 904-912 may be repeated until all elements of the density rank matrix 108 are assigned as associated minimum distance.

At block 914, the elements of the density rank matrix 108 may be sorted. For example, the elements of the density rank matrix 108 may be sorted from smallest to largest distance value.

At block 916, the element values may be replaced with the element ranks. For example, a unique rank value may be assigned from 0 to (X-1)(Y-1)(Z-1). The smallest ranks may begin along the skeleton line, then gradually dilate until all elements in the rectangular period are used. In this manner, the density rank matrix 108 may tessellate all of three-dimensional space.

Referring to FIGS. 14A-14D, examples of application of the rendering module 116 to generate the bistate output object 204 for fixed density inputs for four example values are illustrated. For FIGS. 14A-14D, the size of the bistate output objects may be 2×2×2 periods, which is used to illustrate the nature and periodicity of the dilated structures. For the case of an input density of 99% for FIG. 14D, the output may be visualized by the remaining empty space or holes.

Figure 15:
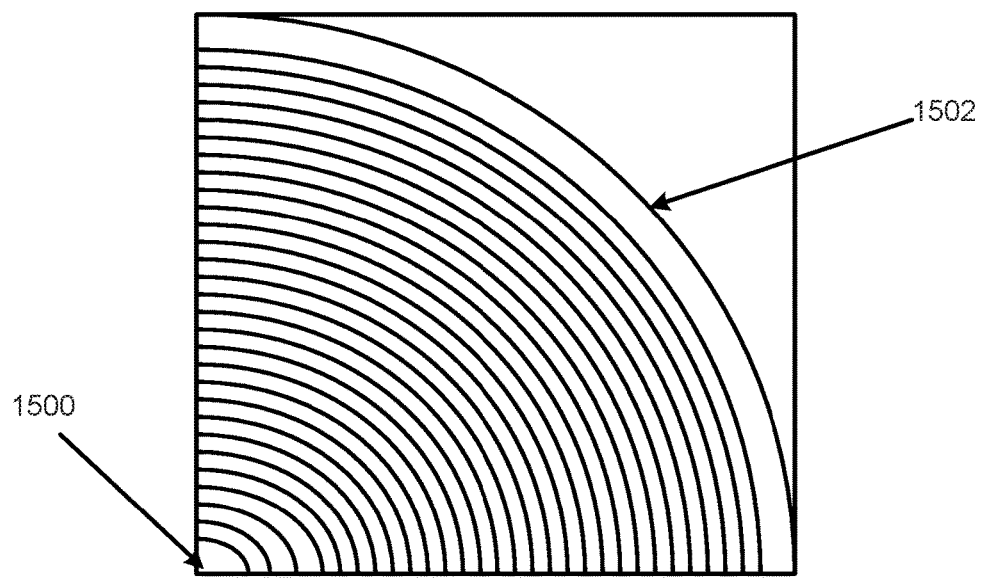
FIG. 15 illustrates a radial cross section of a density map of a sphere, according to an example of the present disclosure.
Figure 16:
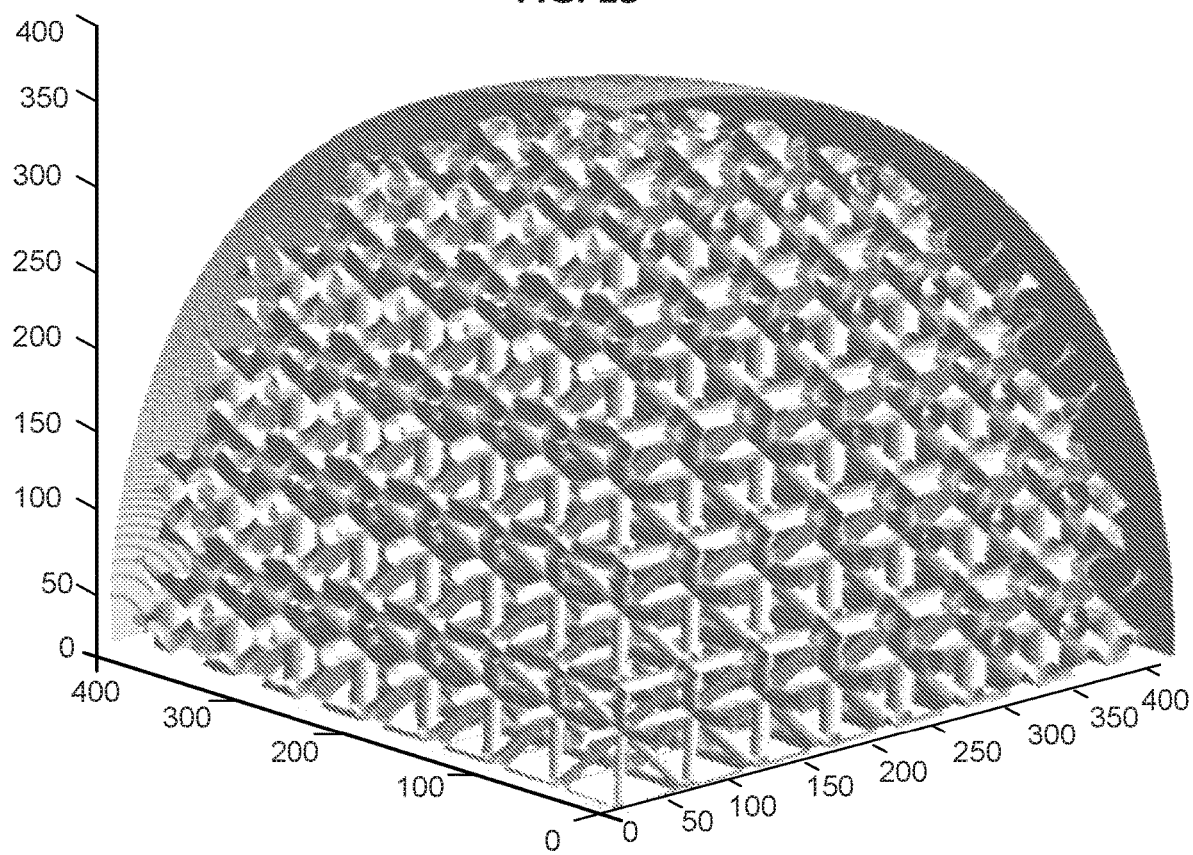
FIG. 16 illustrates one octant of an output object of a variable density sphere input, according to an example of the present disclosure.

As an example of a variable density input object, FIG. 15 illustrates a sphere with a 10% density in the center at location 1500, gradually increasing to 100%, or solid, density at the outer surface at location 1502. A radial cross section of part of the input object is depicted in FIG. 15, with bands representing changes in density. One octant of the rendered bistate output object 204 is shown FIG. 16.

With respect to material blending, the bistate output object 204 may be printed with a single material, or used as a placeholder to be filled by other mixtures of materials. Rendering this substrate to include material blending may provide for establishment of a relatively strong connected structure.

Figure 18:
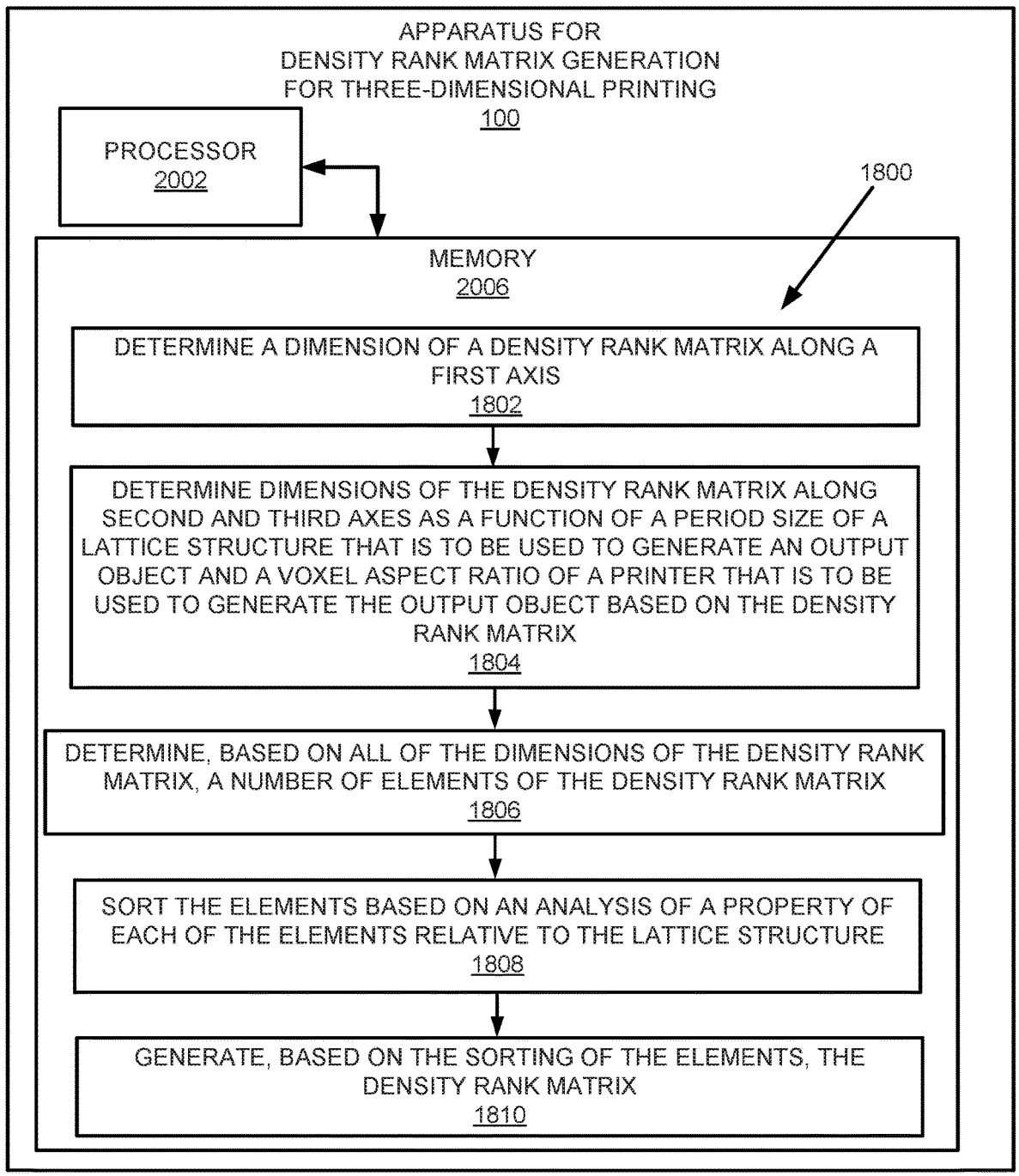
FIG. 18 illustrates another flowchart of a method for density rank matrix generation for three-dimensional printing, according to an example of the present disclosure.
Figure 19:
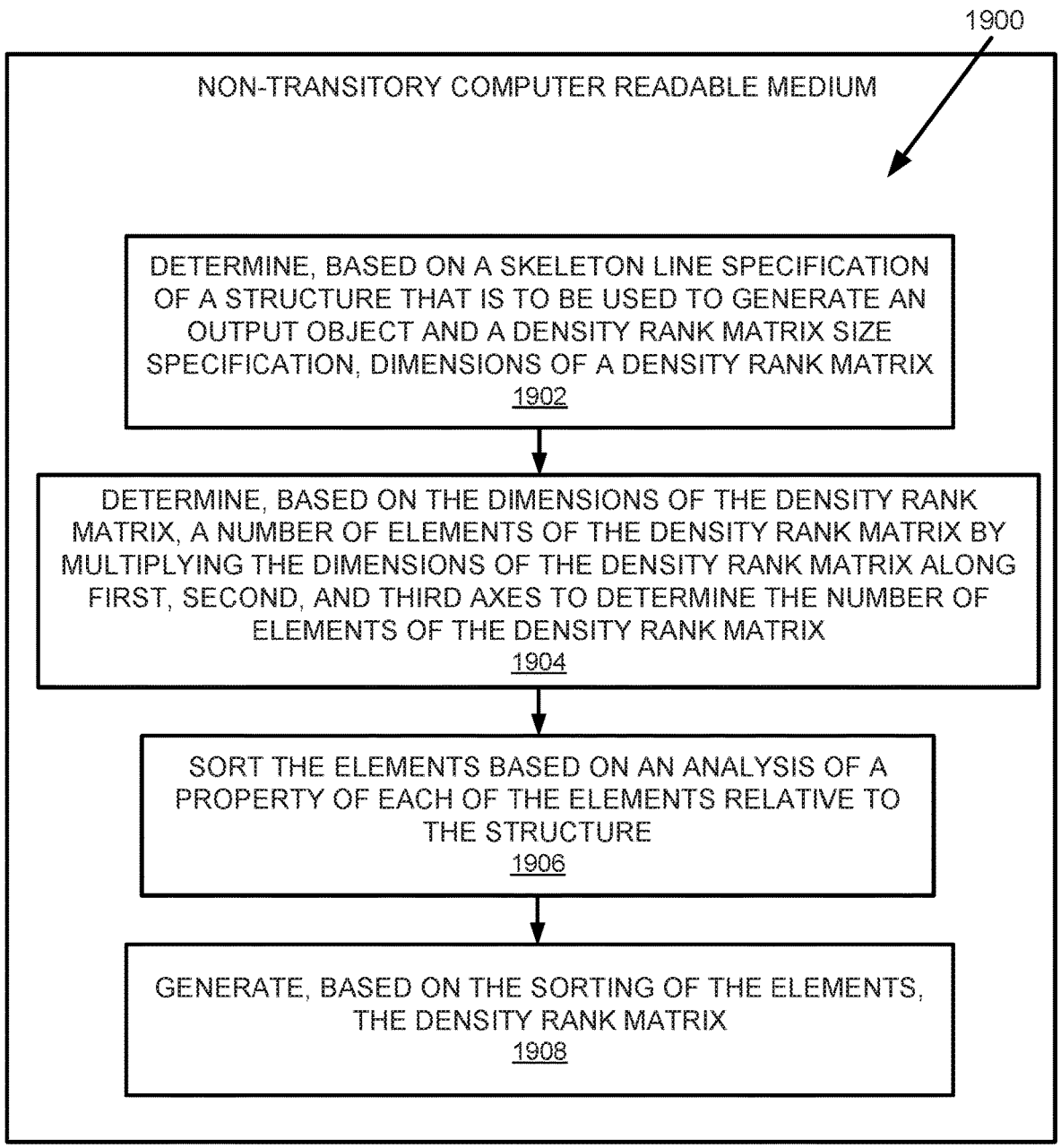
FIG. 19 illustrates a further flowchart of a method for density rank matrix generation for three-dimensional printing, according to an example of the present disclosure.

FIGS. 17-19 respectively illustrate flowcharts of methods 1700, 1800, and 1900 for density rank matrix generation for three-dimensional printing, corresponding to the example of the apparatus 100 whose construction is described in detail above. The methods 1700, 1800, and 1900 may be implemented on the apparatus 100 with reference to FIGS. 1-16 by way of example and not limitation. The methods 1700, 1800, and 1900 may be practiced in other apparatus. The steps disclosed herein with respect to the methods 1700, 1800, and 1900 may be performed by a processor (e.g., the processor 2002 of FIG. 20).

Referring to FIGS. 1-17, and particularly FIG. 17, for the method 1700, at block 1702, the method may include determining, based on a skeleton line specification 104 of a lattice structure and a density rank matrix size specification 106, dimensions of the density rank matrix 108 (e.g., see also block 900 of FIG. 9).

At block 1704, the method 1700 may include determining, based on the dimensions of the density rank matrix 108, a number of elements of the density rank matrix 108. For example, for an X by Y by Z density rank matrix 108, the total number of elements n may include X times Y times Z elements.

At block 1706, the method 1700 may include sorting the elements based on an analysis of a property of each of the elements relative to the lattice structure (e.g., see also block 914 of FIG. 9).

At block 1708, the method 1700 may include generating, based on the sorting of the elements, the density rank matrix 108 (e.g., see also discussion with respect to FIG. 9).

The method 1700 may further include normalizing the density rank matrix 108 to generate a density threshold matrix 114, receiving specifications of a three-dimensional input object 112, and comparing each of the specifications of the three-dimensional input object 112 to a corresponding threshold value in the density threshold matrix 114 to determine whether to generate a voxel. For example, the rendering module 116 may compare each element of the 3D input object 112, input(x, y, z), against a corresponding threshold value in the density threshold matrix 114, threshold(x, y, z), at each location, to determine whether to turn on the voxel (i.e., to generate the voxel).

For the method 1700, comparing each of the specifications of the three-dimensional input object 112 to the corresponding threshold value in the density threshold matrix 114 to determine whether to generate the voxel may further include applying a modulo operation to each threshold value in the density threshold matrix 114. Further, a determination may be made as to whether a specification of a three-dimensional input object is greater than a corresponding modulo based threshold value. The corresponding modulo based threshold value may represent a threshold value to which the modulo operation is applied. In response to a determination that the specification of the three-dimensional input object is greater than the corresponding modulo based threshold value, the method 1700 may include indicating generation of the voxel. In response to a determination that the specification of the three-dimensional input object is less than or equal to the corresponding modulo based threshold value, the method 1700 may include indicating not to generate the voxel. For example, if Input(x, y, z)>Threshold (x', y', z'), then Output(x, y, z)=1 (i.e., printer voxel), else Output(x, y, z)=0 (i.e., empty space), where x'=x mod X; y'=y mod Y; and z'=z mod Z.

For the method 1700, receiving the skeleton line specification 104 of the lattice structure may further include receiving the skeleton line specification 104 of a tetrahedral-octahedral lattice structure (e.g., see also discussion with respect to FIGS. 7 and 8).

For the method 1700, the tetrahedral-octahedral lattice structure may include a repeating period including a dimensional ratio of 1, 1, and 42, respectively, relative to first, second, and third axis of a line skeleton of the tetrahedral-octahedral lattice (e.g., see also discussion with respect to FIGS. 7 and 8).

For the method 1700, determining, based on the skeleton line specification 104 and the density rank matrix size specification 106, dimensions of the density rank matrix 108 may further include determining a dimension of the density rank matrix 108 along a first axis, and determining the dimensions of the density rank matrix 108 along second and third axes as a function of a period size of the lattice structure and a voxel aspect ratio of a printer that is to generate an output object 204 based on the density rank matrix 108 (e.g., see also block 900 of FIG. 9).

The method 1700 may further include determining, based on the skeleton line specification 104, a unit skeleton line set as a list of lines defined by two end points, and scaling the unit skeleton line set by multiplying values of the unit skeleton line set with corresponding dimensions of the density rank matrix 108 along the first, second, and third axes (e.g., see also discussion with respect to FIGS. 10 and 11).

For the method 1700, determining, based on the dimensions of the density rank matrix 108, the number of elements of the density rank matrix 108 may further include multiplying the dimensions of the density rank matrix 108 along first, second, and third axes to determine the number of elements of the density rank matrix 108.

For the method 1700, sorting the elements based on the evaluation of the property of each of the elements relative to the lattice structure may further include determining, for each of the elements, distances of each element from each specified line of a line skeleton of the lattice structure, determining, from the distances, a minimum distance for each of the elements, sorting the elements according to corresponding minimum distances defined by the minimum distance for each of the elements, and replacing each of the elements with a rank value that corresponds to an order of the sorting of the elements (e.g., see also blocks 904, 906, 910, 912, and 914 of FIG. 9).

Referring to FIGS. 1-16 and 18, for the method 1800, at block 1802, the method may include determining a dimension of the density rank matrix 108 along a first axis.

At block 1804, the method 1800 may include determining dimensions of the density rank matrix 108 along second and third axes as a function of a period size of a lattice structure that is to be used to generate an output object and a voxel aspect ratio of a printer that is to be used to generate the output object based on the density rank matrix 108 (e.g., see also block 900 of FIG. 9).

At block 1806, the method 1800 may include determining, based on all of the dimensions of the density rank matrix 108, a number of elements of the density rank matrix 108.

At block 1808, the method 1800 may include sorting the elements based on an analysis of a property of each of the elements relative to the lattice structure (e.g., see also blocks 904, 906, 910, 912, and 914 of FIG. 9).

At block 1810, the method 1800 may include generating, based on the sorting of the elements, the density rank matrix 108 (e.g., see also discussion with respect to FIG. 9).

Referring to FIGS. 1-16 and 19, for the method 1900, at block 1902, the method may include determining, based on a skeleton line specification 104 of a structure that is to be used to generate an output object 204 and a density rank matrix size specification 106, dimensions of the density rank matrix 108 (e.g., see also block 900 of FIG. 9).

At block 1904, the method 1900 may include determining, based on the dimensions of the density rank matrix 108, a number of elements of the density rank matrix 108 by multiplying the dimensions of the density rank matrix along first, second, and third axes to determine the number of elements of the density rank matrix 108. For example, for an X by Y by Z density rank matrix 108, the total number of elements n may include X times Y times Z elements.

At block 1906, the method 1900 may include sorting the elements based on an analysis of a property of each of the elements relative to the structure (e.g., see also block 914 of FIG. 9).

At block 1908, the method 1900 may include generating, based on the sorting of the elements, the density rank matrix 108 (e.g., see also discussion with respect to FIG. 9).

Figure 20:
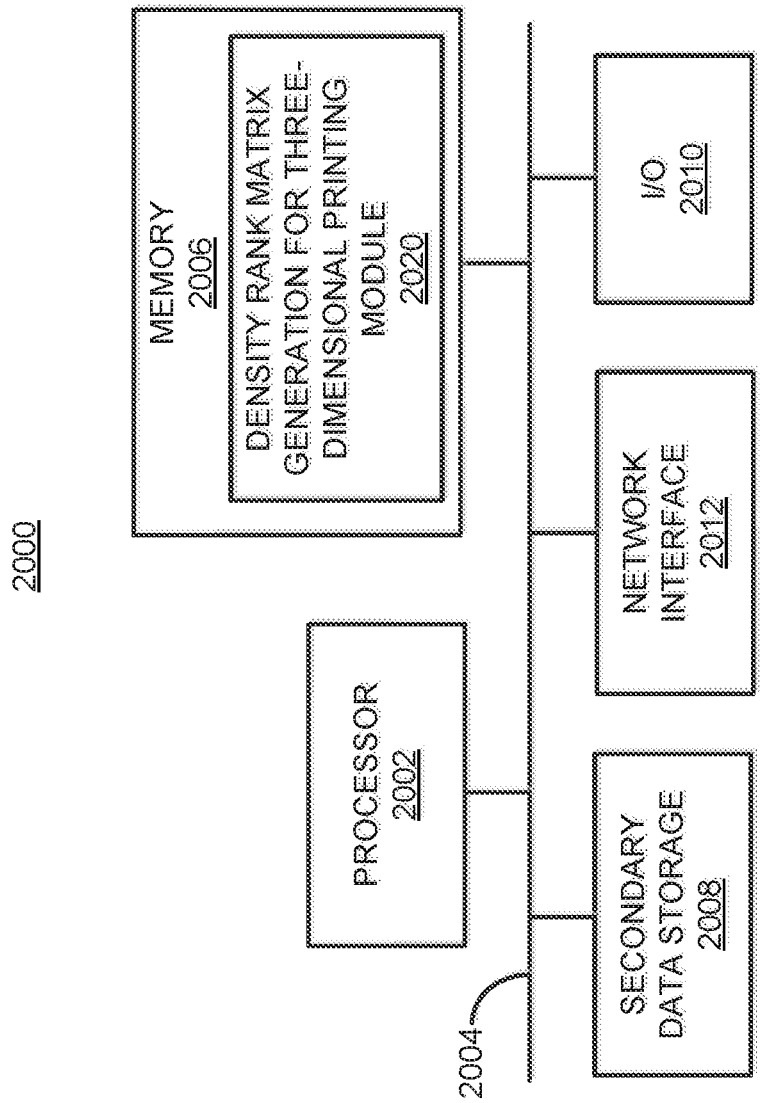
FIG. 20 illustrates a computer system, according to an example of the present disclosure.

FIG. 20 shows a computer system 2000 that may be used with the examples described herein. The computer system 2000 may represent an operational platform that includes components that may be in a server or another computer system. The computer system 2000 may be used as a platform for the apparatus 100. The computer system 2000 may execute, by a processor (e.g., a single or multiple processors) or other hardware processing circuit, the methods, functions and other processes described herein. These methods, functions and other processes may be embodied as machine readable instructions stored on a computer readable medium, which may be non-transitory, such as hardware storage devices (e.g., RAM (random access memory), ROM (read only memory), EPROM (erasable, programmable ROM), EEPROM (electrically erasable, programmable ROM), hard drives, and flash memory).

The computer system 2000 may include the processor 2002 that may implement or execute machine readable instructions performing some or all of the methods, functions and other processes described herein. Commands and data from the processor 2002 may be communicated over a communication bus 2004. The computer system may also include the main memory 2006, such as a random access memory (RAM), where the machine readable instructions and data for the processor 2002 may reside during runtime, and a secondary data storage 2008, which may be nonvolatile and stores machine readable instructions and data. The memory and data storage are examples of computer readable mediums. The memory 2006 may include a density rank matrix generation for 3D printing module 2020 including machine readable instructions residing in the memory 2006 during runtime and executed by the processor 2002. The density rank matrix generation for 3D printing module 2020 may include the modules of the apparatus 100 shown in FIG. 1.

The computer system 2000 may include an I/O device 2010, such as a keyboard, a mouse, a display, etc. The computer system may include a network interface 2012 for connecting to a network. Other known electronic components may be added or substituted in the computer system.

What has been described and illustrated herein is an example along with some of its variations. The terms, descriptions and figures used herein are set forth by way of illustration and are not meant as limitations. Many variations are possible within the spirit and scope of the subject matter, which is intended to be defined by the following claims— and their equivalents—in which all terms are meant in their broadest reasonable sense unless otherwise indicated.

What is claimed is:

1. A method for density rank matrix generation for three-dimensional printing, the method comprising:
   determining, based on a skeleton line specification of a lattice structure and a density rank matrix size specification, dimensions of a density rank matrix, the density rank matrix including a minimum distance for each element of the density rank matrix to a line of a line skeleton of the lattice structure;
   determining, based on the dimensions of the density rank matrix, a number of elements of the density rank matrix;
   sorting, by a processor, the elements based on an analysis of a property of each of the elements relative to the lattice structure; and
   generating, based on the sorting of the elements, the density rank matrix.

2. The method according to claim 1, further comprising:
   normalizing the density rank matrix to generate a density threshold matrix;
   receiving specifications of a three-dimensional input object; and
   comparing each of the specifications of the three-dimensional input object to a corresponding threshold value in the density threshold matrix to determine whether to generate a voxel.

3. The method according to claim 2, wherein comparing each of the specifications of the three-dimensional input object to the corresponding threshold value in the density threshold matrix to determine whether to generate the voxel further comprises:
   applying a modulo operation to each threshold value in the density threshold matrix;
   determining whether a specification of a three-dimensional input object is greater than a corresponding modulo based threshold value, wherein the corresponding modulo based threshold value represents a threshold value to which the modulo operation is applied;
   in response to a determination that the specification of the three-dimensional input object is greater than the corresponding modulo based threshold value, indicating generation of the voxel; and
   in response to a determination that the specification of the three-dimensional input object is less than or equal to the corresponding modulo based threshold value, indicating not to generate the voxel.

4. The method according to claim 1, wherein the lattice structure includes a tetrahedral-octahedral lattice structure.

5. The method according to claim 4, wherein the tetrahedral-octahedral lattice structure includes a repeating period including a dimensional ratio of 1, 1, and $\sqrt{2}$, respectively, relative to first, second, and third axis of the line skeleton of the tetrahedral-octahedral lattice.

6. The method according to claim 1, wherein determining, based on the skeleton line specification and the density rank matrix size specification, dimensions of the density rank matrix further comprises:
   determining a dimension of the density rank matrix along a first axis; and
   determining the dimensions of the density rank matrix along second and third axes as a function of a period size of the lattice structure and a voxel aspect ratio of a printer that is to generate an output object based on the density rank matrix.

7. The method according to claim 6, further comprising:
   determining, based on the skeleton line specification, a unit skeleton line set as a list of lines defined by two end points; and
   scaling the unit skeleton line set by multiplying values of the unit skeleton line set with corresponding dimensions of the density rank matrix along the first, second, and third axes.

8. The method according to claim 1, wherein determining, based on the dimensions of the density rank matrix, the number of elements of the density rank matrix further comprises:
   multiplying the dimensions of the density rank matrix along first, second, and third axes to determine the number of elements of the density rank matrix.

9. The method according to claim 1, wherein sorting the elements based on the analysis of the property of each of the elements relative to the lattice structure further comprises:
   determining, for each of the elements, distances of each element from each specified line of the line skeleton of the lattice structure;
   determining, from the distances, the minimum distance for each of the elements;
   sorting the elements according to corresponding minimum distances defined by the minimum distance for each of the elements; and
   replacing each of the elements with a rank value that corresponds to an order of the sorting of the elements.

10. The method according to claim 1, further comprising:
    determining an unassigned element of the density rank matrix; and
    for each unassigned element of the density rank matrix, assigning a minimum distance associated with the unassigned point to the unassigned element.

11. An apparatus for density rank matrix generation for three-dimensional printing comprising:
    a processor; and
    a memory storing machine readable instructions that when executed by the processor cause the processor to:
        determine a dimension of a density rank matrix along a first axis, the density rank matrix including a minimum distance for each element of the density rank matrix to a line of a line skeleton of a lattice structure;
        determine dimensions of the density rank matrix along second and third axes as a function of a period size of the lattice structure that is to be used to generate an output object and a voxel aspect ratio of a printer that is to be used to generate the output object based on the density rank matrix;

determine, based on all of the dimensions of the density rank matrix, a number of elements of the density rank matrix;

sort the elements based on an analysis of a property of each of the elements relative to the lattice structure; and generate, based on the sorting of the elements, the density rank matrix.

12. The apparatus for density rank matrix generation for three-dimensional printing according to claim 11, further comprising machine readable instructions that when executed by the processor further cause the processor to:

determine, based on a skeleton line specification of the lattice structure, a unit skeleton line set as a list of lines defined by two end points; and scale the unit skeleton line set by multiplying values of the unit skeleton line set with corresponding dimensions of the density rank matrix along the first, second, and third axes.

13. The apparatus for density rank matrix generation for three-dimensional printing according to claim 11, wherein the lattice structure includes a tetrahedral-octahedral lattice structure.

14. The apparatus for density rank matrix generation for three-dimensional printing according to claim 11, further comprising machine readable instructions that when executed by the processor further cause the processor to:

determine, for each of the elements, distances of each element from each specified line of the line skeleton of the structure;

determine, from the distances, the minimum distance for each of the elements;

sort the elements according to corresponding minimum distances defined by the minimum distance for each of the elements; and replace each of the elements with a rank value that corresponds to an order of the sorting of the elements.

15. The apparatus for density rank matrix generation for three-dimensional printing according to claim 11, further comprising machine readable instructions that when executed by the processor further cause the processor to:

determine an unassigned element of the density rank matrix; and for each unassigned element of the density rank matrix, assign a minimum distance associated with the unassigned point to the unassigned element.

16. A non-transitory computer readable medium having stored thereon machine readable instructions to provide density rank matrix generation for three-dimensional printing, the machine readable instructions, when executed, cause a processor to:

determine, based on a skeleton line specification of a structure that is to be used to generate an output object and a density rank matrix size specification, dimensions of a density rank matrix, the density rank matrix including a minimum distance for each element of the density rank matrix to a line of a line skeleton of the structure;

determine, based on the dimensions of the density rank matrix, a number of elements of the density rank matrix by multiplying the dimensions of the density rank matrix along first, second, and third axes to determine the number of elements of the density rank matrix;

sort the elements based on an analysis of a property of each of the elements relative to the structure; and generate, based on the sorting of the elements, the density rank matrix.

17. The non-transitory computer readable medium according to claim 16, wherein the structure includes a tetrahedral-octahedral lattice structure.

18. The non-transitory computer readable medium according to claim 16, wherein the machine readable instructions to sort the elements based on the analysis of the property of each of the elements relative to the structure, further comprise machine readable instructions to:

determine, for each of the elements, distances of each element from each specified line of the line skeleton of the structure;

determine, from the distances, the minimum distance for each of the elements;

sort the elements according to corresponding minimum distances defined by the minimum distance for each of the elements; and replace each of the elements with a rank value that corresponds to an order of the sorting of the elements.

19. The non-transitory computer readable medium according to claim 16, wherein the machine readable instructions to sort the elements based on the analysis of the property of each of the elements relative to the structure, further comprise machine readable instructions to:

determine an unassigned element of the density rank matrix; and for each unassigned element of the density rank matrix, assign a minimum distance associated with the unassigned point to the unassigned element.

\* \* \* \* \*